(12) United States Patent
Magzimof et al.

(10) Patent No.: US 10,929,704 B2
(45) Date of Patent: Feb. 23, 2021

(54) LANDSCAPE VIDEO STREAM COMPRESSION USING COMPUTER VISION TECHNIQUES

(71) Applicant: Phantom Auto Inc., Mountain View, CA (US)

(72) Inventors: Shay Magzimof, Palo Alto, CA (US); David Parunakian, Moscow (RU)

(73) Assignee: Phantom Auto Inc., Mountain View, CA (US)

( * ) Notice: Subject to any disclaimer, the term of this patent is extended or adjusted under 35 U.S.C. 154(b) by 76 days.

(21) Appl. No.: 16/296,211

(22) Filed: Mar. 7, 2019

(65) Prior Publication Data

US 2019/0279020 A1 Sep. 12, 2019

Related U.S. Application Data

(60) Provisional application No. 62/641,720, filed on Mar. 12, 2018.

(51) Int. Cl.
| | |
|---|---|
| *H04N 19/172* | (2014.01) |
| *G06K 9/46* | (2006.01) |
| *G06K 9/32* | (2006.01) |
| *G06K 9/62* | (2006.01) |

(52) U.S. Cl.
CPC ......... *G06K 9/4604* (2013.01); *G06K 9/3233* (2013.01); *G06K 9/6267* (2013.01); *H04N 19/172* (2014.11)

(58) Field of Classification Search
CPC combination set(s) only.
See application file for complete search history.

(56) References Cited

U.S. PATENT DOCUMENTS

| | | | | |
|---|---|---|---|---|
| 2011/0286530 A1* | 11/2011 | Tian | ....................... | H04N 19/61 375/240.25 |
| 2013/0300740 A1* | 11/2013 | Snyder | .................... | G06F 3/016 345/420 |
| 2014/0085480 A1* | 3/2014 | Saptharishi | ............ | H04N 7/181 348/159 |
| 2017/0193312 A1* | 7/2017 | Ai | ........................... | G06F 13/20 |

(Continued)

OTHER PUBLICATIONS

Y Lu., "Video Compression for Remotely Controlled Vehicles", Real-Time Imaging, vol. 5, Issue 3, Jun. 1999, pp. 155-165.*

(Continued)

*Primary Examiner* — Omar S Ismail
(74) *Attorney, Agent, or Firm* — Fenwick & West LLP

(57) ABSTRACT

A video encoder compresses video for real-time transmission to a video decoder of a remote teleoperator system that provides teleoperator support to the vehicle based on the real-time video. The video encoder recognizes one or more generic objects in captured video that can be removed from the video without affecting the ability of the teleoperator to control the vehicle. The video encoder removes regions of the video corresponding to the generic objects to compress the video, and generates a metadata stream encoding information about the removed objects. The video decoder generates replacement objects for the objects removed the compressed video. The video decoder inserts the rendered replacement objects into relevant regions of the compressed video to reconstruct the scene.

17 Claims, 6 Drawing Sheets

(56) References Cited

U.S. PATENT DOCUMENTS

2018/0348750 A1* 12/2018 Lupa .................... G05D 1/0022
2018/0373980 A1* 12/2018 Huval ................ G06K 9/00805

OTHER PUBLICATIONS

Herman, Martin, "Video Compression for Remote Vehicle Driving", https://www.spiedigitallibrary.org/conference-proceedings-of-spie on Jul. 16, 2020, pp. 1-7.*

Rafia Inam, "Feasibility Assessment to Realise Vehicle Teleoperation using Cellular Networks", 2016 IEEE 19th International Conference on Intelligent Transportation Systems (ITSC) Windsor Oceanico Hotel, Rio de Janeiro, Brazil, Nov. 1-4, 2016, pp. 1-6.*

Weiman, Carl, "Video compression by matching human perceptual channels", Event: SPIE's International Symposium on Optical Engineering and Photonicsin Aerospace Sensing, 1994, Orlando, FL, United States, Jun. 24, 1994, pp. 3-11.*

Johansson, I. et al., "Self-Clocked Rate Adaptation for Multimedia," SCReAM, RFC 8298, Dec. 2017, pp. 1-36.

Liu, H. et al., "Blind Image Quality Evaluation Metrics Design for UAV Photographic Application," The 5th Annual IEEE International Conference on Cyber Technology in Automation, Control and Intelligent Systems, Jun. 8-12, 2015, pp. 293-297.

Peng, Y-J. et al., "A multimedia transmission control algorithm based on cross-layer design in UMTS networks," Wireless Netw, vol. 21, Oct. 12, 2014, pp. 949-961.

Song, H. et al., "Rate Control for Low-Bit-Rate Video via Variable-Encoding Frame Rates," IEEE Transactions on Circuits and Systems for Video Technology, vol. 11, No. 4, Apr. 2001, pp. 512-521.

Stockhammer, T. et al., "H.264/AVC in Wireless Environments," IEEE Transactions on Circuits and Systems for Video Technology, vol. 13, No. 7, Jul. 2003, pp. 657-673.

Wu, J. et al., "Delay-Constrained High Definition Video Transmission in Heterogeneous Wireless Networks with Multi-Homed Terminals," IEEE Transactions on Mobile Computing, vol. 15, No. 3, Mar. 2016, pp. 641-655.

\* cited by examiner

LANDSCAPE VIDEO STREAM COMPRESSION USING COMPUTER VISION TECHNIQUES

CROSS-REFERENCE TO RELATED APPLICATIONS

This application claims the benefit of U.S. Provisional Application No. 62/641,720 filed on Mar. 12, 2018, the contents of which are incorporated by reference herein.

BACKGROUND

1. Technical Field

The present disclosure relates to video stream compression, and more particularly to compressing video feeds originating from mobile outdoors sources.

2. Description of Related Art

As autonomous vehicle technology continues to develop, safety and reliability remain top concerns. Remote teleoperator systems enable a remote teleoperator (e.g., a human or artificial intelligence agent) to take control of an autonomous vehicle to provide remote control of the vehicle in situations where reliance solely on the autonomous drive system of the vehicle is undesirable. In order to provide remote teleoperation or otherwise provide remote support to a vehicle, it is desirable to stream real-time video from the vehicle to the remote teleoperator system.

In order to stream real-time video under bandwidth constraints, video compression may be desirable. Most existing codecs, systems, and algorithms for video stream compression are designed to perform predictably well on the widest possible range of diverse video streams. Existing video codecs cover many practical use cases, including constant frame rate codecs, closed-circuit video surveillance, applications with limited computing power available and so on. However, existing video compression techniques are not optimized for the type of video captured by a vehicle system for teleoperator support.

SUMMARY

In a first embodiment, a video encoder compresses video captured by a camera of a vehicle for transmission over a wireless network. The video encoder receives a video frame and determines boundaries and classification of a region in the video frame. The classification comprises a predicted object associated with the region, and a confidence level associated with the classification. The video encoder determines if the confidence level exceeds a predefined confidence threshold. Responsive to the confidence level exceeding the predefined confidence threshold, the video encoder removes the region to generate a blanked video frame. The video encoder also generates metadata encoding information specifying a location of the region and the predicted object class associated with the region. This classification and blanking process is repeated for other continuous regions on the frame until a stop signal is received from a higher level software controller. The video encoder then encodes the blanked video frame to generate an encoded video frame. The encoded video frame and the metadata are transmitted to a remote teleoperator system.

In a second embodiment, a video decoder of a teleoperator system decodes video received from a vehicle. The video decoder receives a compressed video frame and metadata identifying a region of the compressed video frame associated with a removed object and identifying the class of the removed object. The video decoder renders a replacement object corresponding to the removed object. This process is repeated for all removed objects described in metadata associated with the video frame. The video decoder then combines the replacement objects with the compressed video frame to generate a decoded video frame and outputs the decoded video frame to a display.

Other embodiments and aspects of different possible implementations are described in detail herein.

BRIEF DESCRIPTION OF THE DRAWINGS

For a more complete understanding of the embodiments, reference is made to the following description and accompanying drawings, in which.

DETAILED DESCRIPTION

A remote teleoperation system provides remote teleoperation support for a vehicle. A video encoder in the vehicle compresses video for real-time transmission to a video decoder of the remote teleoperator system to enable the remote teleoperation system to provide the desired support. The video encoder recognizes one or more generic objects in captured video that can be removed from the video without affecting the ability of the teleoperator to control the vehicle. The video encoder removes regions of the video corresponding to the generic objects to compress the video, and generates a metadata stream encoding information about the removed objects. The video decoder generates replacement objects for the objects removed the compressed video. The video decoder inserts the rendered replacement objects into relevant regions of the compressed video to reconstruct the scene.

The described system beneficially utilizes compression to enable video to be transmitted with low latency so that the teleoperator can respond in real-time to the vehicle environment. The compression technique beneficially recognizes and removes background objects, details of which need not be reconstructed precisely to enable the teleoperator to provide the desired support. The compression technique furthermore operates in an environment in which the camera position and attitude are expected to change only gradually, the mean elevation angle of the camera direction is approximately equal to zero, and the altitude of the camera is fixed within a predictable range (e.g., between 1.0 m to 5.0 m). These limitations enable more efficient recognition of objects and compression of the video.

Figure 1:
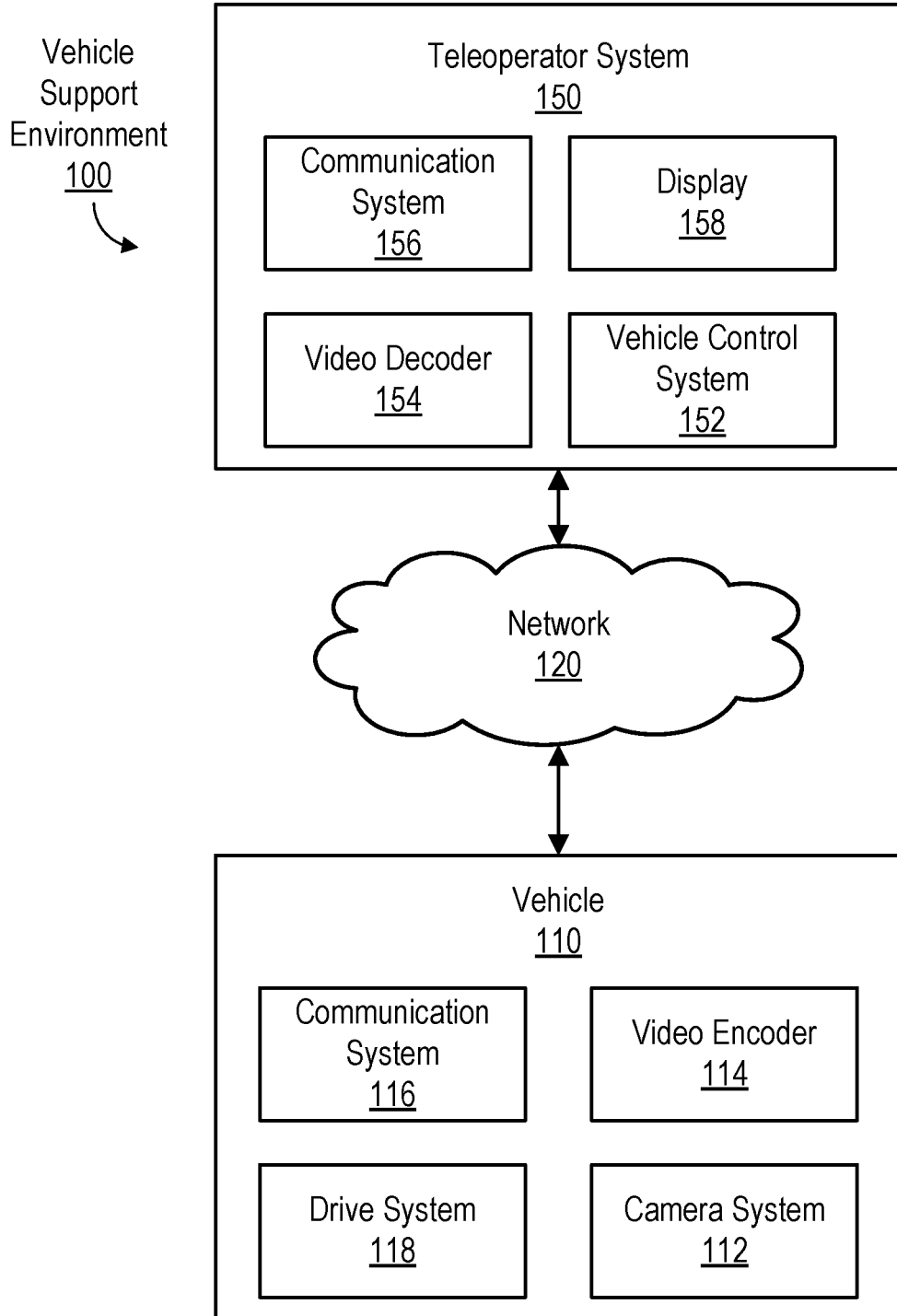
FIG. 1 is a block diagram of a vehicle support environment according to one embodiment.

FIG. 1 is a block diagram of a vehicle support environment 100 for providing teleoperation support from a teleoperator system 150 to a vehicle 100. The vehicle support environment 100 enables a teleoperator system 150 to remotely drive or otherwise control a vehicle 110. In an embodiment, the vehicle 110 comprises an autonomous or semi-autonomous vehicle that is typically autonomous in operation but may occasionally benefit from external assistance including teleoperator control or other remote support. Alternatively, the vehicle 110 may comprise a non-autonomous vehicle that may similarly benefit from remote support. Examples of situations where assistance may be desirable include when one or more vehicle sensors fails, when an unknown problem occurs with the vehicle's autonomous drive software, when the vehicle encounters a barrier or other hazardous road conditions, or when a passenger manually requests remote assistance. Upon requesting remote support, a video stream capturing the vehicle environment may be provided by the vehicle 110 to the teleoperator system 150 to enable the teleoperator system 150 to assess the situation and take appropriate action. Here, the teleoperator system 150 may provide controls to remotely drive the vehicle 110. The controls may be provided by a human agent that is viewing real-time video to simulate driving of the vehicle 110 from the perspective of the human agent. Alternatively, the controls may be provided by an artificial intelligence agent that executes on the teleoperation system 150 in response to a real-time video feed and other sensor data streamed to the teleoperation system 150 from the vehicle 110. As used herein, the vehicle 110 may include a car, a truck, a land vehicle, a seaborne vehicle, a subterranean vehicle, an airborne vehicle, or other vehicle.

In an embodiment, the vehicle 110 comprises a camera system 112, a video processing system 114, a communications system 116, and a drive system 118. In alternative embodiments, the vehicle 110 may include additional or different components. Components of the vehicle 110 (including the video encoder 114) may be implemented as a processor and a non-transitory computer-readable storage medium that stores instructions that when executed causes the processor to perform the functions attributed to the respective components described herein.

The drive system 118 includes standard components for a vehicle drive system include, for example, wheels, axes, transmission, engine, brakes, etc. In an autonomous vehicle, the drive system 118 may furthermore include an autonomous drive system that enable the vehicle 110 to drive autonomously. For example, the autonomous drive system may include various sensors, hardware, and software for enabling the vehicle to automatically navigate a desired route.

The camera system 112 comprises one or more cameras for capturing video depicting the environment of the vehicle 110. In an embodiment, the camera system 112 includes at least one fore camera that captures a view of the environment in front of the vehicle 110 like the view seen by a driver of a conventional vehicle. In an embodiment, the camera system 112 may include a stereo pair of fore cameras located sufficiently apart from each other to enable depth field computation based on a parallax effect. In another embodiment, the camera system 112 may include a LIDAR device to detect depth field data associated with captured video. In an embodiment, the camera system 112 may include one or more additional cameras such as one or more rearview cameras or one or more side view cameras. The camera system 112 may furthermore include cameras that can be static, mobile, rotary, or can switch between these modes.

The video encoder 114 processes video obtained by the camera system 112 to encode video for transmission to the teleoperator system 150. The video encoder 114 includes a generic or industrial computer equipped with one or more graphic processing units. In an embodiment, multiple graphic processing units may perform parallel encoding of frames with few, if any, timeout events to enable real-time transmission of the captured video. Alternatively, or in addition, the video encoder 114 may include local video storage to store video captured by the camera system 112.

In an embodiment, the video encoder 114 applies compression to video frames by identifying recognizable objects in the video frame and blanking (e.g., removing from encoding) areas of the video frame occupied by the recognized objects to reduce the size of the video. The video encoder 114 generates a metadata stream encoding information about the recognized objects that are blanked from the video and their locations to enable the teleoperator system 150 to reconstruct the video from the compressed video frames and the metadata stream. Particularly, the video encoder may recognize generic objects in the environment of the vehicle that need not be reproduced precisely to enable the teleoperator system 150 to provide adequate support and may instead be replaced with generic replacements. Examples of objects that may be recognized and blanked by the video encoder 114 include, for example, the sky, distant foliage, the hood of the vehicle, bodies of water, and distant geographic features in the landscape. In an embodiment, the video encoder 114 processes video frames in substantially real-time (e.g., at least as fast as a frame rate) as they are captured to generate and transmit the compressed video in substantially real-time.

The communication system 116 communicates processed video or other data or control signals to the teleoperator system 150 via the network 120. The communication system 116 may furthermore receive teleoperation control signals or other remote support data from the teleoperator system 150 via the network 120. In an embodiment, the communication system 116 comprises one or more modems for communicating over a cellular network, a WiFi network, a Bluetooth network, or other wireless network. The communication system 116 may furthermore include a low-Earth orbit satellite communication subsystem, or a vehicle-to-vehicle or vehicle-to-infrastructure (V2V and V2I, correspondingly) 802.11p VANET communications system. The communication system 116 may furthermore include storage (e.g., a solid state drive) to store data streams locally for later transmission.

The teleoperator system 150 comprises a vehicle control system 152, a video decoder 154, a communication system 156, and a display 158. In alternative embodiments, the teleoperator system 150 may include additional or different component. Components of the teleoperator system 150 (including the video decoder 154) may be implemented as a processor and a non-transitory computer-readable storage medium that stores instructions that when executed causes the processor to perform the functions attributed to the respective components described herein.

The vehicle control system 152 provides manual control elements and/or an artificial intelligence agent for enabling teleoperation of the vehicle 110. For control by a human teleoperator, the vehicle control system 152 may comprise a steering wheel or other steering device, a brake control, and an acceleration control that provide a simulation of the driving experience to the teleoperator. Alternatively, or in addition, an artificial intelligence agent may be implemented as a processor and a non-transitory computer-readable storage medium that stores instructions that when executed causes the processor to generate control inputs for controlling steering, braking, and/or acceleration of the vehicle 110 in an automated way. Such an artificial intelligence may be implemented as a software system interfacing with data streams and generates control packets directly, or it may be implemented as a robotic appliance physically interfacing with teleoperator workstation implements such as the display 158 and the vehicle control system 152.

The communication system 156 receives video (e.g., compressed video), metadata, and other sensor data from the vehicle 110 via the network 120. The communication system 156 may furthermore send teleoperation control signals or other remote support data to the vehicle 110 from the network 120. In an embodiment, the communication system 156 comprises one or more modems for communicating over a cellular network, a WiFi network, a Bluetooth network, a satellite communications network, a 802.11p VANET network, or other wireless network.

The video decoder 154 obtains compressed video frames and associated metadata from the vehicle 110 and generates a reconstructed (e.g., decompressed) video frame for outputting to the display 158. For example, in an embodiment, the video decoder 154 identifies from the metadata, regions of the video frame that have been blanked and identifies information about respective objects that occupied the blanked regions. The video decoder 154 then obtains or generates a rendering of a replacement object and combines it with the video frame in the blanked region to reconstruct the video. Embodiments of processes for reconstructing video are described in further detail below. In an embodiment, the video decoder 154 processes video frames in substantially real-time (e.g., at least as fast as a frame rate) as they are received to generate substantially real-time video.

In an embodiment, the video decoder 154 may execute on a dedicated computer system serving multiple teleoperator workstations simultaneously or sequentially. Such an arrangement may be useful to optimize total storage space and disk I/O requirements while sharing resources between multiple teleoperator systems 150 supporting multiple vehicles 110.

The display 158 displays reconstructed video frames provided by the video decoder 154. In an embodiment, the display 158 comprises, for example, an LED or LCD display with a high frame rate and wide field of view.

The network 120 represents the communication pathways between the teleoperator system 150 and the vehicle 110. In one embodiment, the network 120 uses standard communications technologies and/or protocols and can include the Internet. In another embodiment, the entities on the network 120 can use custom and/or dedicated data communications technologies. The network 120 may comprise, for example, a public cellular connection, a dedicated or private wireless network, a low-latency satellite uplink, VANET wireless channels (including vehicle-to-vehicle or vehicle-to-infrastructure links), or any combination thereof.

Figure 2:
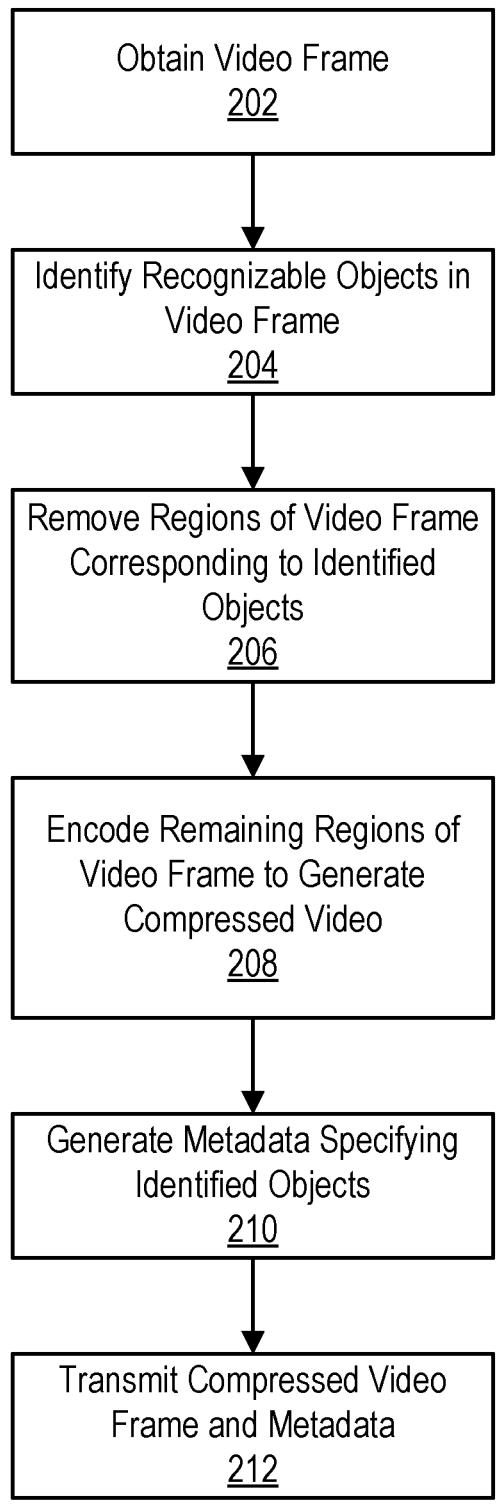
FIG. 2 is a flowchart illustrating an example embodiment of a process for compressing video.

FIG. 2 illustrates an embodiment of a process for providing compressed video from a vehicle 110 to a teleoperator system 150. The video encoder 114 obtains 202 a video frame from the camera system 112. The video encoder 114 identifies 204 one or more recognizable objects in the video frame. For example, in an embodiment, the video encoder 114 identifies one or more regions of the video frame occupied by individual objects of appreciable angular size such as the hood of the vehicle or other parts of the vehicle 110 that partially obstruct the view of the camera system 112. Additionally, the video encoder 114 may identify continuous areas of the video frame occupied by either a quasi-homogeneous set of features that can be considered part of the same object for the purposes of the vehicle teleoperation task such as a remote patch of dense foliage. The video encoder 114 may also identify continuous areas occupied by extended objects such as the sky, a wheat field, a sandy beach, a surface of a lake or other body of water, or other landscape features that are homogenous or have an identifiable pattern. The video encoder 114 performs image recognition of the identified areas using one or more computer vision algorithms to produce a classification result for each of the identified areas. Here, the classification result may comprise a predicted object class selected from a set of predefined recognizable object classes and a confidence rating indicating a predicted likelihood of the region corresponding to the predicted object class. Regions classified with a confidence rating that exceed a predefined threshold (that may be set manually or determined automatically) are then determined to correspond to the predicted object class.

The video encoder 114 removes 206 the regions of the video frame that are determined to correspond to the identified objects. For example, the video encoder 114 may blank the identified regions by removing or zeroing out pixel data. The remaining regions of the video frame (i.e., regions not corresponding to the identified regions associated with the recognized objects) are encoded 208 for transmission to the teleoperator system 150 as a compressed video frame.

The video encoder 114 furthermore generates 210 metadata with information about the regions of the video frame that were removed. For example, the metadata may specify coordinates of the boundaries of each region, depth information (if available), and a classification result indicating the class of object identified in each region. The communication system 116 transmits 212 the compressed video frame and the metadata to the teleoperator system 150 via the network 120. In an embodiment, the video encoder 114 may furthermore detect and include information about observed lighting conditions in the metadata transmitted to the remote teleoperator system 150. For example, the video encoder 114 may obtain lighting information using a dedicated light meter. The metadata may be incorporated into an auxiliary data set that is transmitted together with the video frame.

In an alternative embodiment, instead of transmitting a single classification result, the video encoder 114 transmits multiple most probable classification results and their respective confidence levels as the metadata to the video decoder 154. For example, the video encoder 114 may transmit as metadata any classification results having confidence values above a predefined threshold.

In an embodiment, a predefined time constraint may be placed on processing of each video frame to ensure that the processing does not increase latency beyond a predefined time limit. For example, the processing time may be limited to enable the video frame to be processed in transmitted in less than the frame time, to enable substantially real-time transmission. To meet the time constraint, object detection may be limited to objects that can be recognized within a predefined time limit. In an embodiment, the pixel data for respective regions are blanked after each successful object recognition (which may each take varying processing time) rather than blanking all detected regions in a video frame at once. This beneficially enables some compression to be achieved even in the case where processing of all of the objects cannot be performed within the time constraints desired to enable real-time transmission. The video encoder 114 may also abort the compression procedure when the transmission size benefits introduced can no longer compensate for the extra time necessary for continued compression. For example, the video encoder 114 may receive feedback from the video decoder 154 of the teleoperator system 150 to determine a total processing time for each video frame and modify the encoding process to ensure a maximum total latency is not exceeded. Thus, the vehicle encoder 114 relies on careful onboard measurement of elapsed encoding time, as well as time required for decoding and reconstruction by the video decoder 154. Timeout threshold calculation can be done to impose a limit on the end-to-end latency of the frame capture and display process in order to improve the performance of the teleoperator, as well as keeping the image buffer size from growing indefinitely.

Figure 3:
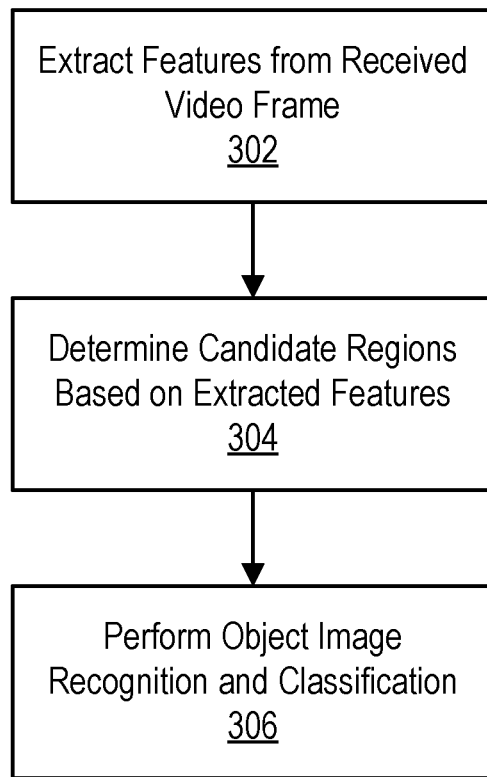
FIG. 3 is a flowchart illustrating an example embodiment of a process for recognizing objects in a video frame.

FIG. 3 illustrates an example embodiment of a process for identifying one or more objects in a video frame. The video encoder 114 extracts 302 features from the video frame. For example, the video frame may be analyzed to extract distinct edges and contours. Additionally, in the case of a camera system 112 having stereo fore cameras, depth information may also be extracted from the image pair. In other embodiments in which the camera system 112 has a single camera, depth information may be generated from alternative techniques, such as a using LIDAR or methods such as texture grain size analysis or other computer vision techniques. In another embodiment, common textures such as grass coverage that have approximately constant features along extended tracts may enable depth detection by characteristic scale analysis of narrow texture strips.

In an embodiment, extraction of features in a particular video frame may rely on interframe tracking techniques. For example, instead of independently detecting features in each video frame, this technique utilizes information about the detected features in prior frames to more efficiently predict feature information for the current frame (e.g., by tracking edges between frames). In an embodiment, the extracted features may be described by a feature vector associated with the video frame.

The video encoder 114 determines 304 candidate regions that may correspond to objects based on the extracted features. The candidate regions may be identified by polygons. For example, in an embodiment, the video encoder 114 detects areas having uniform patterns that are likely to correspond to a common object based on the detected edge, contour, and/or depth features. For example, the video encoder 114 may identify a vertical polygon including a texture of dense foliage oriented parallel to the vector of the movement direction of the vehicle 110. Additionally, the video encoder 114 may utilize computer vision algorithms to detect regions having visual characteristics matching characteristics stored to an objects database. For example, a machine learning model may be used to correlate the extracted features with a set of training objects and the machine learning model may be applied to an input feature set to detect the candidate regions. In other embodiments, a combination of detection techniques may be used.

The video encoder 114 performs an object classification to identify a class of object (e.g., from a predefined list of object classes) corresponding to each of the candidate regions and a confidence score representing a likelihood of an object corresponding to the object class occupying the candidate region. In one embodiment, a plurality of polygons each corresponding to the candidate regions may be classified in parallel. Because different regions may take different processing times to generate a classification result, the video encoder 114 may output the classifications results independently after each result is determined. In the case that a particular candidate region cannot be processed within a predefined time constraint, a predefined classification score (e.g., zero) and/or object class (e.g., "undetermined") may be outputted for the region.

In an embodiment, interframe polygon tracing may beneficially reduce the time for edge detection. Here, the video encoder 114 utilizes information about detected objects in prior frames to better predict objects in a current frame. For example, because the video encoder 114 generally encodes video from forward-looking cameras on a moving vehicle, it can be predicted that remote objects are most likely to grow in size as the vehicle 110 drives towards them, and that these objects increase in size proportionally in a predictable fashion. Using this moving vehicle model, the video encoder 114 can predict the shape of an object based on an identified polygon corresponding to the object in one or more prior frames.

Figure 4:
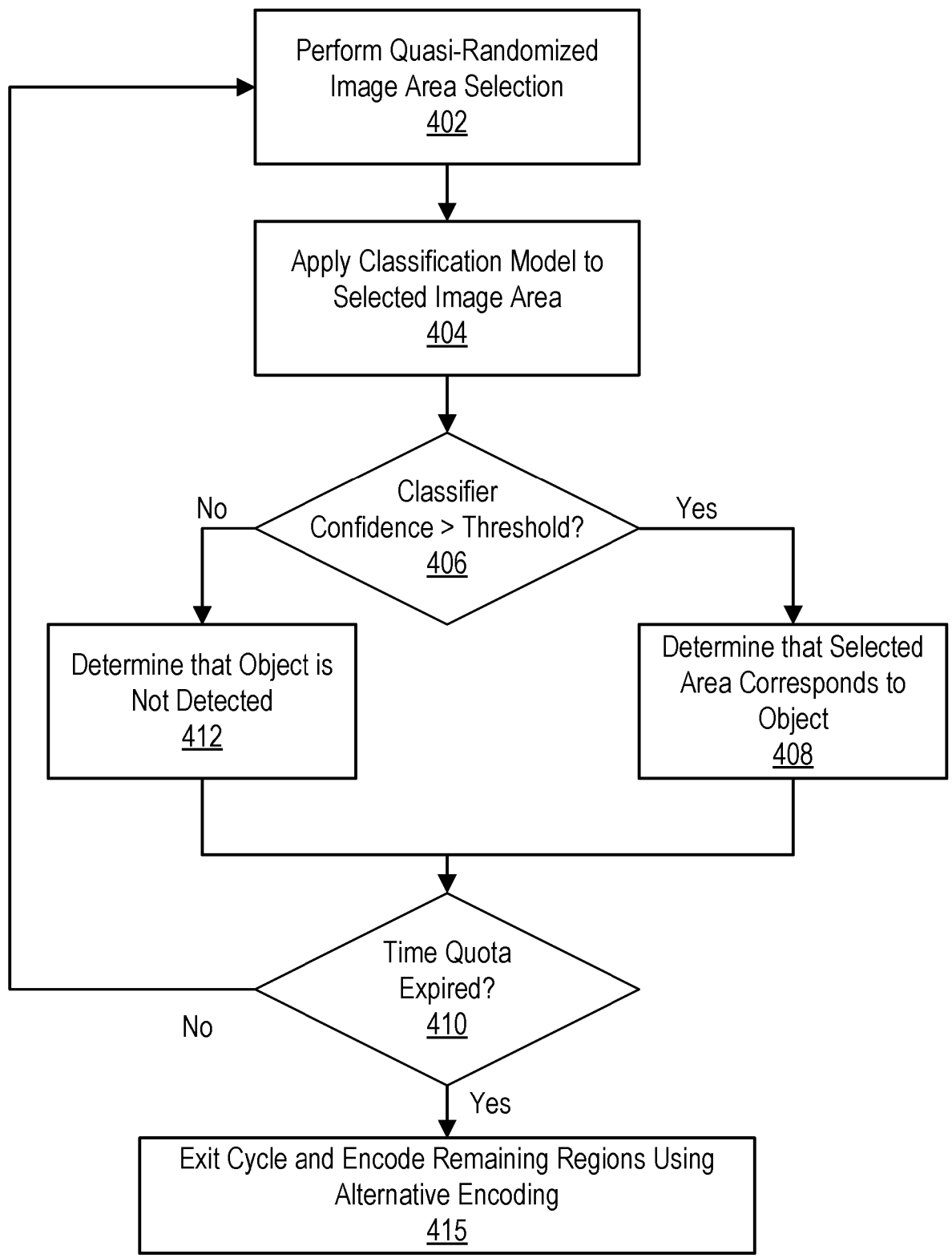
FIG. 4 is a flowchart illustrating an example embodiment of a process for recognizing objects using quasi-randomizing region selection.

FIG. 4 illustrates an alternative embodiment of a process for identifying objects in a video frame. This embodiment may rely on randomized area selection for encoding to reduce the time requirement for complex feature extraction (e.g., edge detection) on initial frames and reduce reliance on interframe edge tracking for subsequent frames. Here, the video encoder 114 performs 402 a quasi-random image area selection process to select a quasi-randomly shaped and sized region of the video frame. Cues for initial area size selection may be taken from preliminary analysis using appropriate computer vision techniques.

The video encoder 114 applies 404 a classification model to the selected area. The video encoder 114 determines 406 if an object is detected with a confidence level that exceeds a predefined threshold. If the confidence exceeds the predefined threshold, the video encoder 114 determines 408 that the selected area corresponds to the object. Otherwise, the video encoder 114 determines 412 that an object is not detected. Afterwards, the video encoder 114 determines 410 if a time quota allocated to the recognition and encoding process is expired. If the time expires, the video encoder 114 exits 415 the object identification cycle and proceeds to blanking areas corresponding to recognized objects and encoding the remaining portion of the image using an alternative video encoding algorithm. Otherwise, the video encoder 114 performs a new quasi-randomized image area selection and the process repeats on the new selected area. In an embodiment, each iteration may split the currently selected quasi-randomized area into two semi-equal regions, which are in turn classified separately. The process may repeat until all areas are identified, the time quota expires, or the selected areas drop below a threshold area size.

In an embodiment, the video encoder 114 may utilize depth field information to first orient the polygon under examination normally to the camera view direction. Although this may introduce minor distortions if the object in question has a complex surface shape, in some scenarios it may be beneficial to present the object being processed to the classifier in a more commonly occurring orientation.

Figure 5:
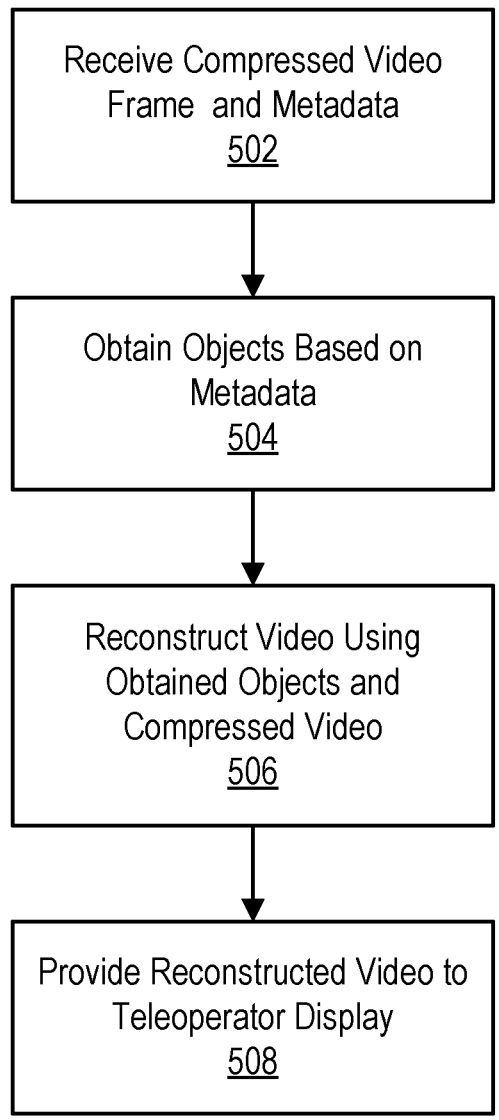
FIG. 5 is a flowchart illustrating an example embodiment of a process for decoding a compressed video frame.

FIG. 5 illustrates an example embodiment of a process for reconstructing a compressed video frame at the teleoperator system 150. The video decoder 154 receives 502 a compressed video frame (that may include blanked portions corresponding to detected objects) and associated metadata. The video decoder 154 obtains 504 replacement objects based on the metadata to fill the blanked regions of the received video frame. Here, the video processing system 150 may obtain sample objects from an object database (e.g., a patch of foliage, sky, or ground) and may generate a replacement object fitting the blanked areas of the compressed video frame based on the sample object and the object boundaries. The video decoder 154 then reconstructs 506 the video frame using the obtained object and the compressed video frame. For example, the video decoder 154 fits the rendered object to the corresponding blanked area of the compressed video frame to reconstruct the original video frame. The reconstructed video frame is provided 508 to the display 158 of the teleoperator system 150.

In an embodiment, the video decoder 154 of the teleoperator system 150 may send control messages to the video encoder 114 of the vehicle 110 to indicate when the video decoder 154 of the teleoperator system 150 is unable to reconstruct a video frame within a predefined time period (e.g., a frame period). In response to the control signal, the video encoder 114 of the vehicle 110 may modify its encoding parameters to reduce the processing burden on the video decoder 154 of the teleoperator system 150 (e.g., by identifying fewer objects and blanking fewer regions of the video frame).

Figure 6:
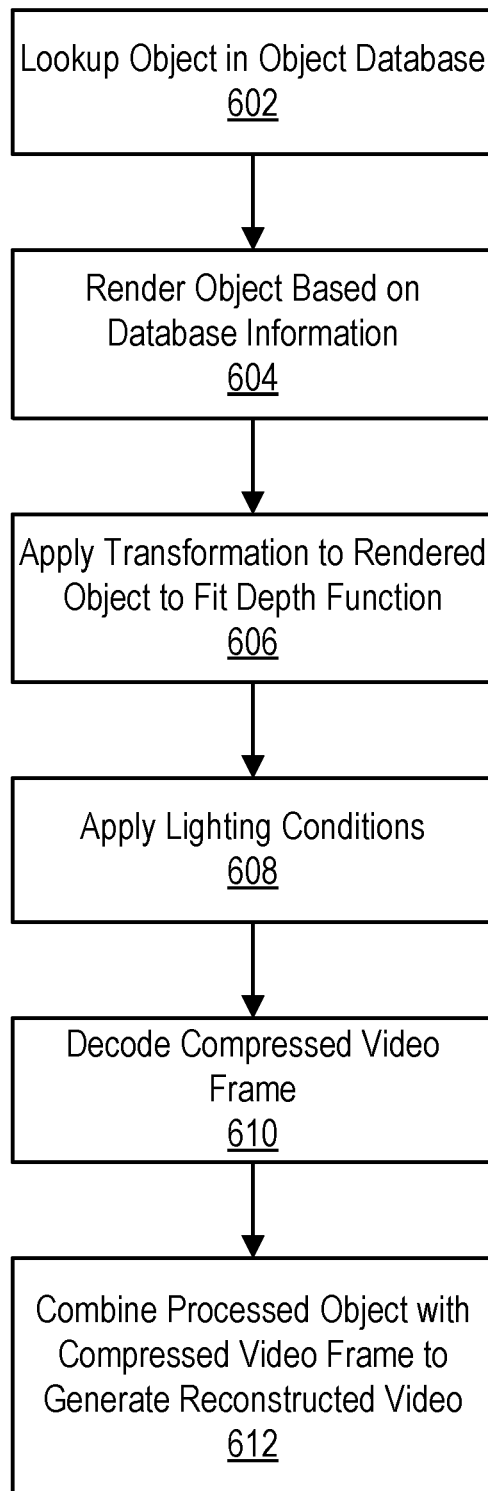
FIG. 6 is a flowchart illustrating an example embodiment of process for reconstructing a compressed video frame.

FIG. 6 illustrates an embodiment of a process for obtaining objects based on the metadata and reconstructing the video frame based on the obtained objects. The video decoder 154 performs a lookup 602 based on the metadata for an object in an object database. The lookup may obtain, for example, a sample object comprising a texture, patch, or image model matching the metadata associated with the object. The video decoder 154 renders 604 the object based on the obtained database information. For example, the video decoder 154 transforms the sample object to cover the blanked object region as specified by the boundary information in the associated metadata. Alternatively, instead of obtaining a sample object from the object database, the video decoder 154 may instead obtain procedural generator instructions for generating a texture corresponding to the object that fills the specified boundaries of the object region. In other embodiments in which the video encoder 114 transmits multiple possible object classes for a region, the video decoder 154 may select a replacement object for rendering based on the multiple possible objects. For example, the replacement object may be selected as an adequate replacement for any of the different possible objects. The video decoder 154 may apply 606 a transformation to the rendered object to fit a depth function associated with the region as may be specified in the metadata. Furthermore, the video decoder 154 may apply 608 lighting details to the rendered object based on its position and depth information. The lighting details may be based on the lighting information received in the metadata from the encoder 114. Alternatively, the video decoder 154 obtains information that enables calculation of lighting conditions based on the local time and location of the vehicle 110. For example, the video decoder 154 may obtain information from a third party server that maps the local time and location of the vehicle 110 to information such as the position of the Sun and the Moon and cloud coverage. The video decoder 154 decodes 610 the compressed video frame including the blanked regions and combines 612 the rendered object with the decoded compressed video frame to reconstruct the original video frame.

In an embodiment, the video decoder 154 performs a geo-temporal querying technique that looks up information about the geographic location and local time of the vehicle 110 in order to obtain or render objects that conform to the expected environment of the vehicle 110. For example, the video decoder 154 may request textures or rendering models for rendering vegetation and terrain textures consistent with the location the vehicle is currently traversing and the climate or seasonal conditions. Furthermore, the video decoder 154 may adjust lighting direction, color, and luminosity level based on the geo-temporal information.

In an embodiment, the video decoder 154 may generate an error message responsive to encountering metadata associated with an object that is not found in the object database. This message may be indicative of a corrupt object database or a misconfigured video encoder 114 and/or video decoder 154. In this case, an error message is logged and reported to an administrator (e.g., via the display 158). The video decoder 154 may furthermore send a system message to the video encoder 114 marking the object class that it failed to reconstruct as disallowed for future encoding.

In an embodiment, the video encoder 114 stores in non-transient computer memory a default list of identifiers for object classes that are not allowed to be encoded using compression (i.e., by blanking the region of the frame corresponding to the object). Such object classes may include bicyclists, vehicles and vehicle parts, traffic cones, road surface marking or other object classes important to the task of vehicle teleoperation.

In further embodiments, the video decoder 154 may enhance the reconstructed video with visual cues to further assist the teleoperator system 150. In an embodiment, the camera system 112 may include one or more high-speed cameras that enable the video encoder 114 to determine with a reasonable accuracy the relative velocity of objects captured, i.e., the optical flow of the vehicle's surroundings. The result of this computation may be used to add metadata signifying the potential importance or danger presented by observed objects. This metadata may be transmitted to the teleoperator system 150 to enable the teleoperator system to render the appropriate visual cues, or to change the order of object processing as well as adjust compression timeouts.

In another embodiment, the video decoder 154 may perform visual recognition of license plates of vehicles around the vehicle 110. The video decoder 154 may look up a crash history of the vehicles or their presumed drivers and present information overlaid on the video. For instance, a sports car registered to a person with a history of reckless driving may be highlighted in red to draw the teleoperator's attention to it to enable the teleoperator to exercise additional caution. A further embodiment may also implement similar visual cues for highlighting police and emergency service vehicles.

Another embodiment may apply in the case of a vehicle 110 traveling heavily utilized routes. Here, a collection of reference images may be stored dataset as captured by other vehicles 110 that have previously traveled the same route. The reference images can be pre-processed to determine a three-dimensional layout of the surrounding landscape and structures from the vehicle's perspective and a composite image of the environment may be generated. The video encoder 114 may match real-time video frames captured by the vehicle 110 against the stored three-dimensional layout and composite images in for the route in order to determine the pixel areas corresponding to objects that do not match the expected visual scene. These objects may be identified as potential obstacles for which the vehicle may benefit from teleoperator support in navigating around. Similarly, pre-collected images corresponding to a particular route may be utilized by a teleoperator in cases where the vehicle 110 does not have much leeway along its route (e.g. cargo truck route along a quarry wall or a rail transport system) to enable the teleoperator to view video of the environment as it would appear when clear of intervening traffic.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for compressing video captured by a camera of a vehicle for transmission over a wireless network, the method comprising:
   receiving a video frame;
   performing a selection of a first region of the video frame of quasi-random shape and size;
   applying a first classification to the first region;
   responsive to the first classification failing to recognize an object in the first region with at least a threshold confidence level, splitting the first region into at least two sub-regions including at least a second region and a third region; and applying a second classification to the second region;

determining a predicted object associated with the region based on the second classification, and a confidence level associated with the second classification;

determining that the confidence level exceeds a predefined confidence threshold;

responsive to the confidence level exceeding the predefined confidence threshold, removing the second region to generate a blanked video frame;

generating metadata encoding information specifying a location of the second region and the predicted object associated with the second region;

encoding the blanked video frame to generate an encoded video frame; and transmitting the encoded video frame and the metadata to a remote teleoperator system.

2. The method of claim 1, wherein applying the second classification comprises:

extracting edge and contour features from the video frame;

detecting object boundaries based on the edge and contour features to generate a polygon; and classifying the polygon as corresponding to the detected object.

3. The method of claim 1, wherein the video frame comprises a stereo video frame, wherein applying the second the classification comprises:

extracting edge and contour features from the video frame;

generating a depth map for the video frame;

detecting object boundaries based on the edge and contour features and the depth map to generate a polygon; and classifying the polygon as corresponding to the detected object.

4. The method of claim 1, wherein generating the metadata further comprises:

determining a location and local time of the vehicle; and encoding the location and local time of the vehicle in the metadata.

5. The method of claim 1, wherein generating the metadata further comprises:

determining lighting conditions associated with a scene of the video frame; and encoding the lighting conditions in the metadata.

6. A method for decoding video received at a teleoperator system from a vehicle, the method comprising:

receiving a compressed video frame;

receiving metadata identifying a region of the compressed video frame associated with a removed object and identifying an object class of the removed object;

determining depth information from the received metadata;

obtaining a replacement object corresponding to the removed object;

applying a transformation to the replacement object to render a transformed replacement object that is fitted to the region of the compressed video frame in accordance with the depth information;

combining the transformed replacement object with the compressed video frame to generate a decoded video frame; and outputting the decoded video frame to a display.

7. The method of claim 6, wherein obtaining the replacement object comprises:

performing a lookup of the object class in an objects database to obtain the replacement object as corresponding to the object class.

8. The method of claim 6, wherein obtaining the replacement object comprises:

performing a lookup of the object class in an objects database to obtain generator instructions for generating the replacement object corresponding to the object class; and executing the generator instructions to generate the replacement object.

9. The method of claim 6, wherein applying the transformation comprises:

detecting lighting conditions associated with a scene of the compressed video frame; and applying the lighting conditions to the replacement object.

10. The method of claim 6, further comprising:

generating one or more visual cues to assist a teleoperator in teleoperation of the vehicle;

overlaying the one or more visual cues on the decoded video frame.

11. A non-transitory computer-readable storage medium storing instructions executable by a processor for compressing video captured by a camera of a vehicle for transmission over a wireless network, the instructions when executed causing the processor to perform steps including:

receiving a video frame;

performing a selection of a first region of the video frame of quasi-random shape and size;

applying a first classification to the first region;

responsive to the first classification failing to recognize an object in the first region with at least a threshold confidence level, splitting the first region into at least two sub-regions including at least a second region and a third region; and applying a second classification to the second region;

determining a predicted object associated with the region based on the second classification, and a confidence level associated with the second classification;

determining that the confidence level exceeds a predefined confidence threshold;

responsive to the confidence level exceeding the predefined confidence threshold, removing the second region to generate a blanked video frame;

generating metadata encoding information specifying a location of the second region and the predicted object associated with the second region;

encoding the blanked video frame to generate an encoded video frame; and transmitting the encoded video frame and the metadata to a remote teleoperator system.

12. The non-transitory computer-readable storage medium of claim 11, wherein applying the second classification comprises:

extracting edge and contour features from the video frame;

detecting object boundaries based on the edge and contour features to generate a polygon; and classifying the polygon as corresponding to the detected object.

13. The non-transitory computer-readable storage medium of claim 11, wherein the video frame comprises a stereo video frame, wherein applying the second classification comprises:

extracting edge and contour features from the video frame;

generating a depth map for the video frame;

detecting object boundaries based on the edge and contour features and the depth map to generate a polygon; and classifying the polygon as corresponding to the detected object.

14. A non-transitory computer-readable storage medium storing instructions executable by a processor for decoding video received at a teleoperator system from a vehicle, the instructions when executed by the processor causing the processor to perform steps including:

receiving a compressed video frame;

receiving metadata identifying a region of the compressed video frame associated with a removed object and identifying an object class of the removed object;

determining depth information from the received metadata;

obtaining a replacement object corresponding to the removed object;

applying a transformation to the replacement object to render a transformed replacement object that is fitted to the region of the compressed video frame in accordance with the depth information;

combining the transformed replacement object with the compressed video frame to generate a decoded video frame; and outputting the decoded video frame to a display.

15. The non-transitory computer-readable storage medium of claim 14, wherein obtaining the replacement object comprises:

performing a lookup of the object class in an objects database to obtain the replacement object as corresponding to the object class.

16. The non-transitory computer-readable storage medium of claim 14, wherein obtaining the replacement object comprises:

performing a lookup of the object class in an objects database to obtain generator instructions for generating the replacement object corresponding to the object class; and executing the generator instructions to generate the replacement object.

17. The non-transitory computer-readable storage medium of claim 14, wherein applying the transformation comprises:

detecting lighting conditions associated with a scene of the compressed video frame; and applying the lighting conditions to the replacement object.

* * * * *